United States Patent
Matsubara et al.

(10) Patent No.: US 6,334,499 B1
(45) Date of Patent: Jan. 1, 2002

(54) OUTPUT CONTROL APPARATUS FOR HYBRID VEHICLES

(75) Inventors: Atsushi Matsubara; Asao Ukai; Shigetaka Kuroda; Kazutomo Sawamura; Hideyuki Oki; Kan Nakaune, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/660,944

(22) Filed: Sep. 13, 2000

(30) Foreign Application Priority Data

Sep. 17, 1999 (JP) .................................................. 11-264608

(51) Int. Cl.$^7$ ...................................................... B60K 6/00
(52) U.S. Cl. ........................ 180/65.2; 701/104; 701/112; 290/40 A
(58) Field of Search ................................. 180/65.1, 65.2, 180/65.3, 65.8; 701/99, 101, 102, 103, 104, 112, 22; 318/139, 431, 430, 432, 433, 140; 290/9, 40 A; 123/332, 333

(56) References Cited

U.S. PATENT DOCUMENTS 5,862,497 A * 1/1999 Yano et al. ............... 180/65.2 X
6,138,784 A * 10/2000 Oshima et al. ........... 180/65.2 X
6,140,780 A * 10/2000 Oshima et al. ................ 318/139
6,184,603 B1 * 2/2001 Hamai et al. ................. 180/65.2
6,196,344 B1 * 3/2001 Tamor ....................... 180/65.1 X
6,262,491 B1 * 7/2001 Kitajima et al. ......... 180/65.2 X

* cited by examiner

Primary Examiner—Christopher P. Schwartz
Assistant Examiner—F. Zeender
(74) Attorney, Agent, or Firm—Armstrong, Westerman, Hattori, McLeland & Naughton, LLP

(57) ABSTRACT

An output control apparatus for a hybrid vehicle is provided, capable of preventing stopping of the engine at the time of recovering from a deceleration fuel cut and improving the acceleration capability. In a hybrid vehicle comprising an engine, a motor for assisting the driving power of the engine, and a battery for supplying electric power for the motor, the output control apparatus comprises an engine speed sensor, an idle stop execution judgement flag F_FCEX, and a motor ECU for judging whether the output assistance by the motor is to be executed, and the motor ECU comprises a deceleration fuel cut returning time permission judgement device (S026) for permitting the output assistance by the motor, when it is judged to return from the deceleration fuel cut by the flag value of the idle stop execution judgement flag F_FCEX, and when it is detected that the engine speed at the time of returning from the deceleration fuel cut is lower than a predetermined engine speed #NEMGMOT.

2 Claims, 8 Drawing Sheets

OUTPUT CONTROL APPARATUS FOR HYBRID VEHICLES

BACKGROUND OF THE INVENTION

1. Field of the Invention

The present invention relates to an output control apparatus for hybrid vehicles, and particularly relates to an output control apparatus for hybrid vehicles provided with an idle stop function.

2. Background Art

Conventional hybrid vehicles provided with a motor in addition to an engine as a driving source for travelling are known.

A parallel hybrid vehicle is a type of hybrid vehicle which uses a motor as an auxiliary driving source for assisting the output of the engine. Such hybrid vehicles are designed so as to be able to satisfy the driver's demands while preserving a remaining state of the charge of the battery, that is, the state of charge of the battery by executing a variety of controls, such as using a motor for supplementing the driving force at the time of acceleration, and charging the battery by deceleration regeneration at the time of deceleration. Such conventional hybrid vehicles are disclosed in, for example, Japanese Unexamined Patent Application, First Publication No. Hei 7-123509.

In order to improve the fuel efficiency, a type of hybrid vehicles is provided with a function for cutting the fuel supply (hereinafter, called a "fuel cut") at the time of deceleration. The fuel cut makes it possible to save otherwise wasted fuel and to improve the fuel consumption rate. Vehicles provided with the fuel cut function are constituted such that the engine speed is lowered while the fuel cut continues, and when the engine speed reaches a predetermined speed (approximately a little higher than that at the time of idling but without stalling), the fuel supply is automatically restarted suspending the fuel cut.

Recently, however, in order to further improve the fuel consumption rate, an idle stop mode is provided, in which the fuel cut continues until the engine stops without restarting the fuel supply even if the engine speed reaches a fuel supply restarting speed, when the driving conditions satisfy certain conditions, that is, when the driver executes a particular operation subsequently to stop the vehicle.

In a hybrid vehicle provided with such an idle stop mode, no problem arises when the driver stops the vehicle as scheduled. However, a problem arises when the driver again accelerates the vehicle in the idle stop mode, because of a change of the driving conditions (such as the conditions of the road or traffic signals), the engine may not be unable to recover the speed and the vehicle may stall, since the engine speed is already below the automatically recoverable speed.

Therefore, when the vehicle is in the idle stop mode, it is necessary to prevent the driver from being subjected to an uneasy feeling due to sudden stopping of the engine or due to a shock caused by the motor entering into the acceleration mode from the deceleration regeneration mode, against the driver's wishes due to the driver's operation of the accelerator pedal.

SUMMARY OF THE INVENTION

It is therefore an object of the present invention to provide an output control apparatus of a hybrid vehicle, capable of preventing stopping of the engine at the time of returning from the fuel cut mode, and improving the acceleration performance.

The first aspect of the present invention provides an output control apparatus for a hybrid vehicle comprising: an engine (for example, the engine E in the present embodiment), a motor (for example, the motor M in the present embodiment) for assisting the output power of said engine, and a battery device (for example, the battery 3 in the present embodiment) for supplying electric power to said motor; wherein the output control apparatus comprises: an output assistance judgement device (for example, the motor ECU 1 in the present embodiment) for judging whether said motor should assist an output of the engine depending upon driving conditions of said vehicle; a controlling amount setting device (for example, the motor ECU 1 in the present embodiment) for setting the controlling amount of said motor depending upon a driving state of said engine when the output of the engine is judged by said output assisting judgement device to receive assistance; an output assistance control device (for example, the motor ECU 1 in the present embodiment) for carrying out the output assistance of said engine by said motor based on the controlling amount set by said controlling amount setting device; and an engine speed (for example, the engine speed NE in the present embodiment) detecting device (for example, the engine speed sensor S2 in the present embodiment) for detecting the engine speed; a deceleration fuel cut judging device (for example, the idle stop execution judgement flag F_FCEX in the present embodiment) for judging whether the fuel supply is to be cut at the time of decelerating the vehicle; and a deceleration fuel cut returning time permission judgement device (for example, step S026 in the present embodiment), provided with said output assistance judgement device, for permitting engine output assistance by said motor, when said deceleration fuel cut judgement device judges that the fuel supply is to be started returning from the fuel supply cut, and when it is detected by said engine speed detecting device that the engine speed at the time of starting the fuel supply returning from the fuel supply cut is lower than the predetermined engine speed (for example, the emergency motor start permission lower limit engine speed #NEMGMOT in the present embodiment).

The output control apparatus with the above described structure makes it possible to assist the engine with the motor when the deceleration fuel cut return time permission judgement device determines to return from the deceleration fuel cut mode and when the engine speed at that time is lower than the predetermined engine speed. That is, when the driver depresses the accelerator pedal to accelerate the car while the car is in the deceleration fuel cut mode, if the engine speed at that time is below the predetermined engine speed, and when the deceleration fuel cut returning time permission judgement device determines to return from the deceleration fuel cut and when the output power assistance judgement device determines to assist the engine output power by the motor, the engine power for driving the vehicle is supplemented by the motor.

According to the second aspect of the present invention, in an output control apparatus of a hybrid vehicle according to the first aspect, the output control apparatus of a hybrid vehicle comprises a gradual fuel addition device for executing a gradually addition of the fuel supply at the time of returning from the time of the fuel supply cut.

The above described structure allows for the vehicle to be accelerated gradually by the gradual addition of the fuel supply.

DETAILED DESCRIPTION OF THE INVENTION

Hereinafter, a preferred embodiment of the present invention will be described with reference to attached drawings.

Figure 1:
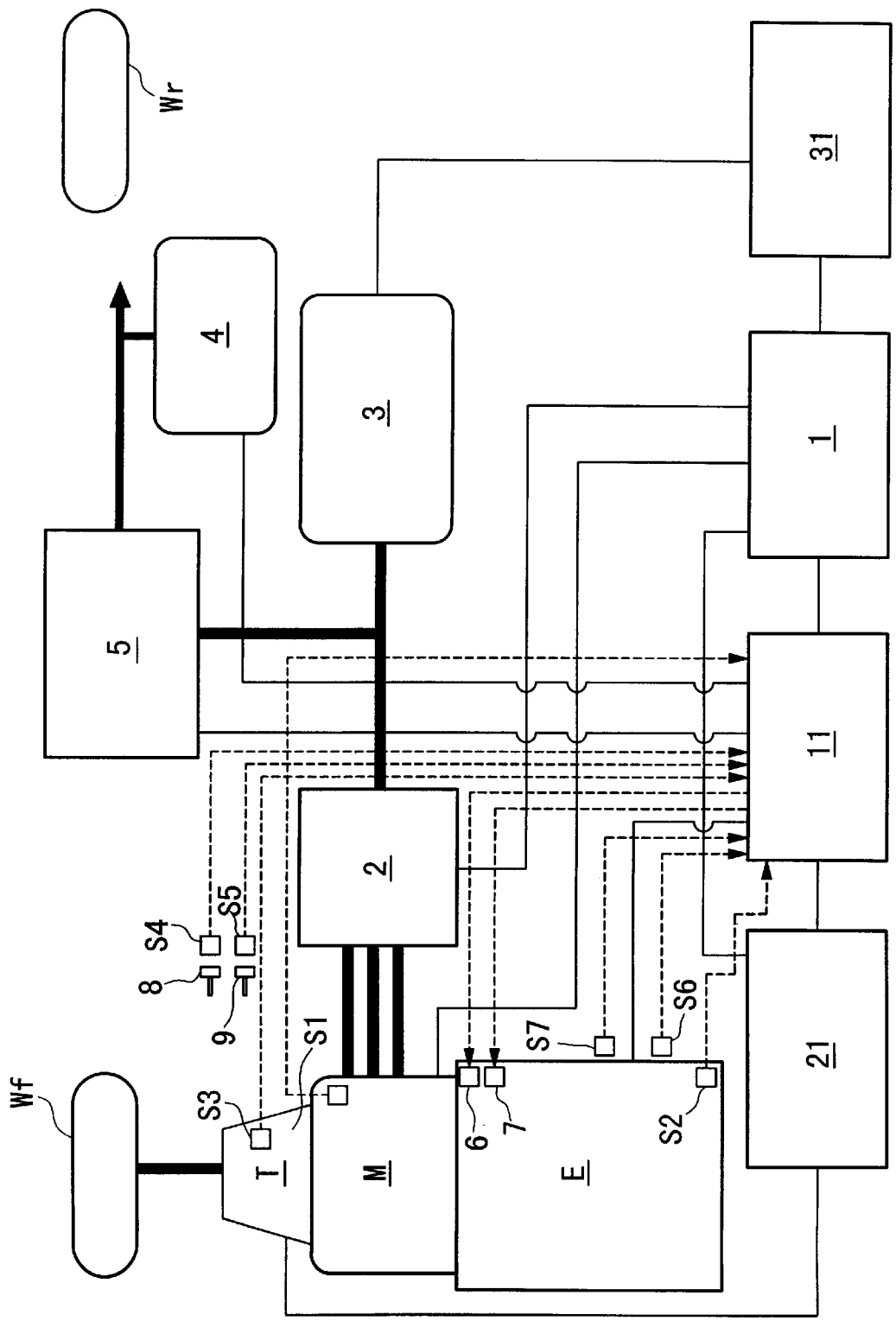
FIG. 1 is a diagram showing the entire structure of a hybrid vehicle.

FIG. 1 is a diagram showing an embodiment applied to a parallel hybrid vehicle, and the driving forces of both engine E and the motor M are transmitted to the two front wheels Wf and Wf, which are driving wheels, through a transmission, which may be an automatic transmission or may be a manual transmission. When the driving force is transmitted from both front wheels Wf and Wf to the motor M of a hybrid vehicle at the time of deceleration, the motor M functions as a generator to generate what is called a regenerative braking force, and the kinetic energy of the vehicle body is recovered as electric energy.

The drive and the regenerative motion of the motor M is executed by the power drive unit 2 under the command of motor electronic control unit ECU 1. The power drive unit 2 is connected with a high voltage battery for exchanging electric energy with the motor M. The battery 3 is composed of a plurality of modules connected in series with each other and the module is composed of a plurality of cells in series with each other. A 12V auxiliary battery 4 is installed in a hybrid vehicle for driving various auxiliary accessories and this auxiliary battery 4 is connected to the battery 3 through a downconverter 5. The downverter 5 controlled by FIECU 11 reduces the voltage of the battery 3 and charges the auxiliary battery 4.

The FIECU 11 controls actuation of a fuel supply amount control device for controlling the amount of the fuel supply to the engine E, actuation of a starter motor 7, and ignition timings, in addition to the motor ECU 1 and the downverter 5. Various signals are input into the FIECU 11 such as signals from the vehicle speed sensor SI which detects the vehicle speed based on the rotation speed of the driving shaft of the transmission; a signal from an engine speed sensor S2 which detects the engine speed NE; a signal from a shift position sensor S3 which detects the shift position of a transmission T; a signal from a brake switch S4 which detects the operation of a brake pedal 8; a signal from a clutch switch S5 which detects the operation of the clutch pedal 9; a signal from a degree of throttle opening sensor S6 which detects the degree of throttle opening TH, a signal from an intake pipe pressure sensor S7 which detects an intake pipe pressure PB. Here, the numeral 21 denotes a CVTECU for controlling a CVT (Continuous Variable Transmission), and the numeral 31 denotes a battery control unit ECU for calculating the state of charge (SOC) of the battery 3.

Here, the hybrid vehicle of the present embodiment is provided with a deceleration fuel cut function. This deceleration fuel cut is used for reducing the fuel consumption at the time of deceleration by cutoff the fuel supply in order to improve the fuel consumption rate. However, the present fuel cut is provided with a function, in which, when the engine speed reaches a certain low speed (that is, a predetermined engine speed NOBJ as described later), the fuel supply can be restarted so as to be able to smoothly shift to a subsequent acceleration mode. In addition, this hybrid vehicle is provided with an idle stop function. This idle stop function is a characteristic feature of hybrid vehicles. This idle cut mode is a mode effectively utilizing the capability to start the engine by the motor to continue the fuel cut even when the engine speed reaches a predetermined engine, speed, if the driver intends to stop the vehicle.

When the vehicle is a MT (manual transmission) car, the idle stop is executed under the conditions that the state of charge (SOC) of the battery is beyond a predetermined level, the temperature of the water is above a predetermined temperature, the throttle is fully opened, the car speed is less than a predetermined speed, and the clutch is depressed.

Thus, at the time of the deceleration fuel cut, if the driver executes a certain operation which indicates that the driver intends to stop subsequently, the vehicle goes into the idle stop mode, and the fuel supply is not restarted even when the engine speed falls below the predetermined speed, if the conditions of the idle mode operation are satisfied.

Hereinafter, the terms "motor starting control after returning from the extended fuel cut", "enforced assistance control after returning from the fuel cut", and "control by calculating the gradual fuel addition coefficient" are described.

[Motor starting control after returning from the extended fuel cut]

Figure 2:
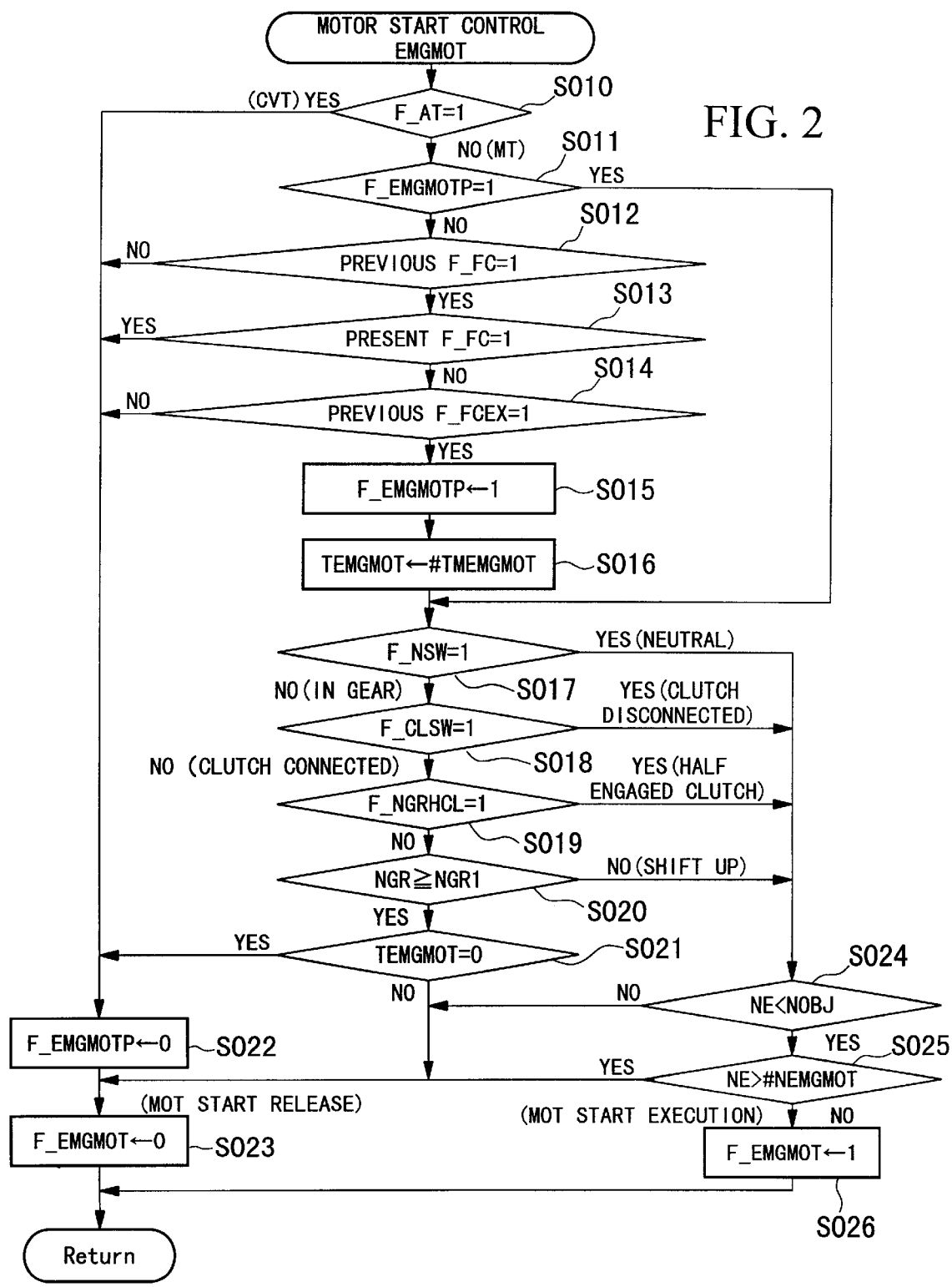
FIG. 2 is a flow-chart showing the motor start control after returning from the fuel cut mode when the fuel cut time is extended.

First, a motor actuation control after returning from the extended fuel cut will be described with reference to the flow-chart shown in FIG. 2. This control is to forcibly start the motor when the engine speed is very low when returning from the fuel cut, in order to prevent reduction of the engine speed and stopping of the engine.

In step S010, a judgement is made as to whether the MT/CVT flag is "1". When the result is "YES", that is, the judgement indicates that the vehicle is a CVT car, the emergency motor start permission flag F_EMGMOTP is set to "0" at step 022, and an emergency motor start permission flag F_EMGMOT is set to "0" in step S023 and the flow is returned.

When the result of the judgement in step S010 is "NO", that is, the judgement indicates that the vehicle is a MT car, the flow goes to step S011, and a judgement is made as to whether the emergency motor start permission flag F_EMGMOTP is "1". When the result of the judgement in step S011 is "YES", that is, the emergency motor start permission flag F_EMGMOTP is "1", the flow goes to step S017. When the result of the judgement is "NO", that is, when the emergency motor start permission flag F_EMGMOTP is "0", a judgement is made as to whether the previous fuel cut flag F_FC is "1" in step S012. That is, the above-described emergency motor start permission flag F_EMGMOTP is a flag for passing the judgement of steps S012, S013, and S014 once the judgements of these steps are completed.

When it is determined that the previous fuel cut flag F_FC is "0" as the result of the judgement in step S012, the flow goes to step S022. When the previous fuel cut judgement flag F_FC is determined to be "1" as the result of step S012, the flow goes to step S013, the flow goes to step S013 and a judgement is made as to whether the present fuel cut judgement flag F_FC is "1".

If it is determined. as a result of the judgement in step S013 that the present fuel cut flag F_FC is "1", the flow goes to step S022. If it is determined as a result of the judgement in step S013 that the present fuel cut flag F_FC is "0", the flow goes to step S014. That is, the judgements in steps S012 and S013 determine that the state of the vehicle is to be returned from the fuel cut.

In step S014, a judgement is made as to whether the previous idle stop execution judgement flag F_FCEX is "1". That is, a judgement is made as to whether the fuel cut is carried out in the previous idle stop mode. When the result of the judgement in step S014 is "NO", the flow goes to step S022, and no emergency motor assistance is executed. That is, if the previous fuel cut is executed while not in the idle mode, the engine will recover by restarting the fuel supply at a predetermined engine speed (the target idle speed NOBJ as described later).

When the result of the judgement in step S014 is "YES", the flow goes to step S015, the flow goes to step S017, after setting the emergency start permission flag F_EMGMOTP to "1" in step S015 and after setting the emergency start timer TEMGMOT to a predetermined value #TMEMGMOT (for example, 2 sec.) in step S016.

A judgement is made at step S017 as to whether a neutral switch flag F_NSW is "1". When the result of the judgement is "YES", that is, the switch is neutral, then the flow goes to step S024. When the result at step S017 is "NO", that is, the judgement indicates that the switch is in an in-gear state, the flow then goes to step S018.

A judgement is made in stop 018 as to whether a clutch switch flag F_CLSW is "1". When the result is "YES", that is, when the clutch is "disconnected", the flow goes to step 024. When the result of the judgement in step S018 is "NO", that is, when the clutch is "connected", the flow goes to step S019. In this step S019, a judgement is made as to whether the half engaged clutch judgement flag F_NGRHCL is "1". The result of the judgement in step S019 indicates that the clutch is half engaged, the flow goes to step S024.

When the result of the judgement in step S019 indicates that the clutch is not in the half engaged state, the flow goes to step 020, wherein a judgement is made as to whether there is a change between the previous and the present gear positions by comparing the previous gear position NGR and the present gear position NGR1. When the result of the judgement is "NO", that is, when the gear position is shifted up, the flow then goes to step S024. When the result of the judgement in step S020 is "YES", that is, when the previous and the present gear positions are the same, the flow goes to step S021 and a judgement is made as to whether the emergency motor start timer TEMGMOT is "0".

When the result of the judgement in step S021 is "YES", that is, when it is determined that the emergency motor start timer TEMGMOT is "0", the flow goes to step S022. When the result of the judgement in step S021 is "NO", that is, when it is determined that the emergency motor start timer TEMGMOT is not "0", the flow goes to step S023.

In step S024, a judgement is made as to whether the engine speed NE's lower than the target idling engine speed NOBJ (for example, 900 rpm). When the result of the judgement is "NO", that is, when the engine speed is equal to or higher than the target idling engine speed, the flow goes to step S023. This is because the engine can start to turn without the aid of the motor if the idling engine speed is equal to or higher than the target idling speed after returning from the fuel cut.

When the result of the judgement in step S024 is "YES", that is, when the engine speed NE is lower than the target idling engine speed NOBJ, the flow goes to step S025 and a judgement is made as to whether the engine speed NE is higher than the emergency motor start permission lower limit engine speed #NEMGMOT (for example, 500 to 600 rpm).

When the result of the judgement in step S025 indicates that the engine speed NE is higher than the emergency motor start permission lower limit engine speed #NEMGMOT, the flow goes to step S023. When the result of the judgement in step S025 indicates that the engine speed NE is lower than the emergency motor start permission lower limit engine speed #NEMGMOT, then the engine restarts after returning from the fuel cut is not possible without assistance, and the flow goes to step S026, wherein the emergency motor start flag F_EMGMOT is set to "1" in order to execute the motor start and the flow is returned.

As described above, when the driver desires to accelerate the vehicle a gain during execution of the idling stop and when the engine speed is below the lower limit of the restarting from the idle stop (that is, the result of the judgement at step S025 is "NO"), the engine stop of the vehicle can be prevented because the motor can assist the driving force of the engine. Consequently, the returning engine speed from the fuel cut can be set at an engine speed lower than the emergency motor start permission lower limit engine speed #NEMGMOT, which results in improving the fuel consumption rate.

[Enforced assistance control after returning from the fuel cut]

Figure 3:
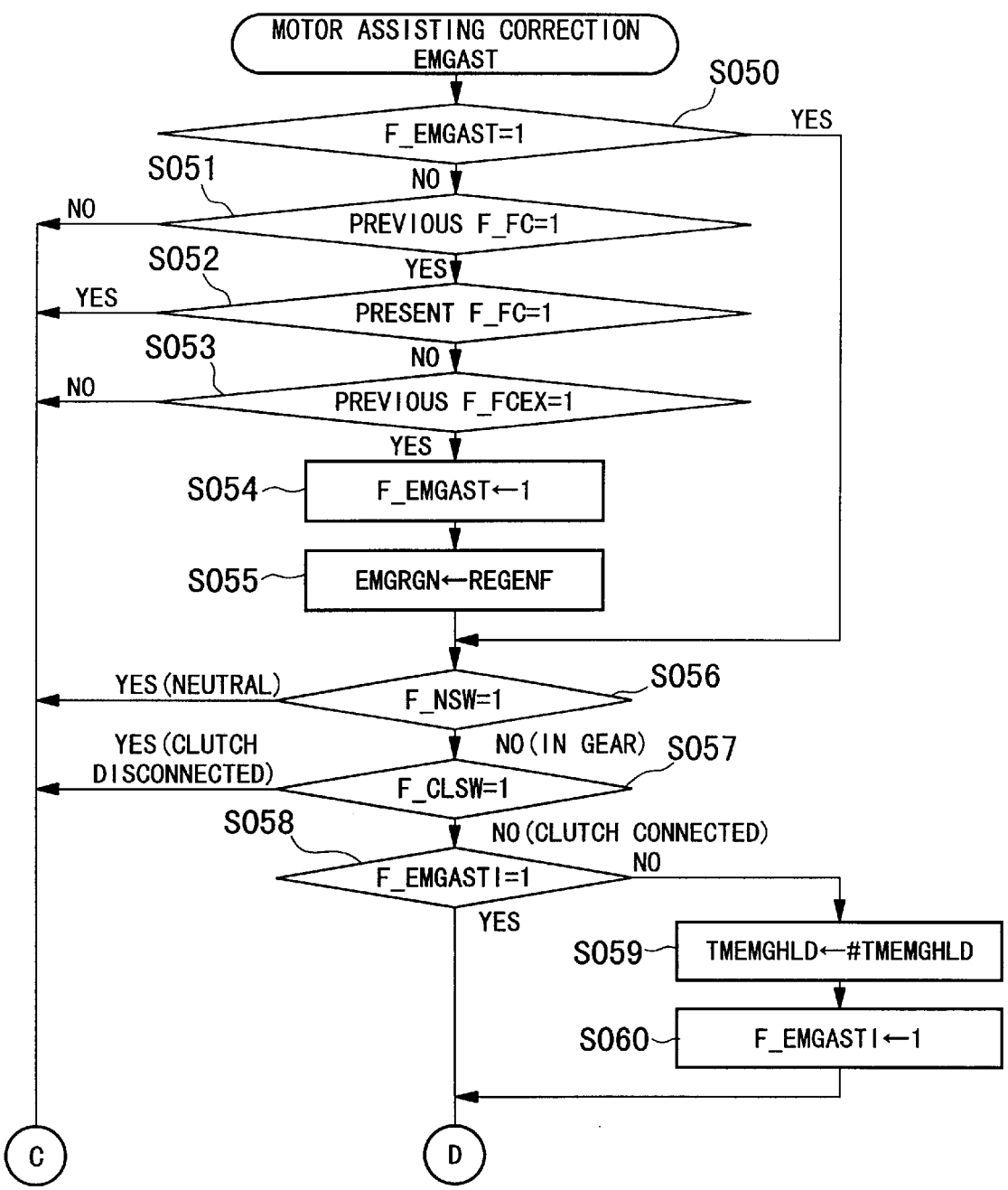
FIG. 3 is a flow-chart showing forced assistance control after returning from the fuel cut mode.
Figure 4:
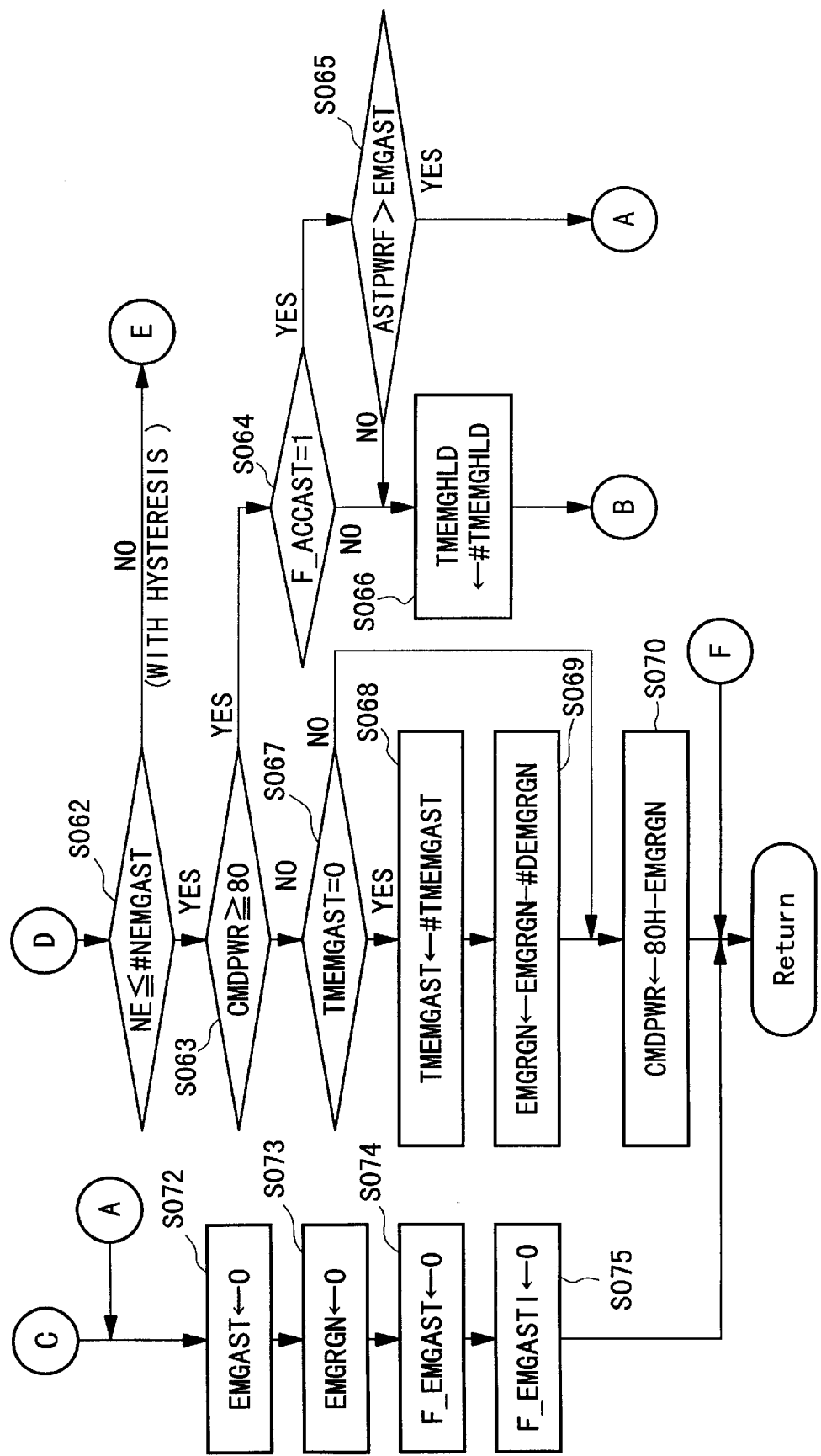
FIG. 4 is a flow-chart showing the forced assistance control after returning from the fuel cut mode.
Figure 5:
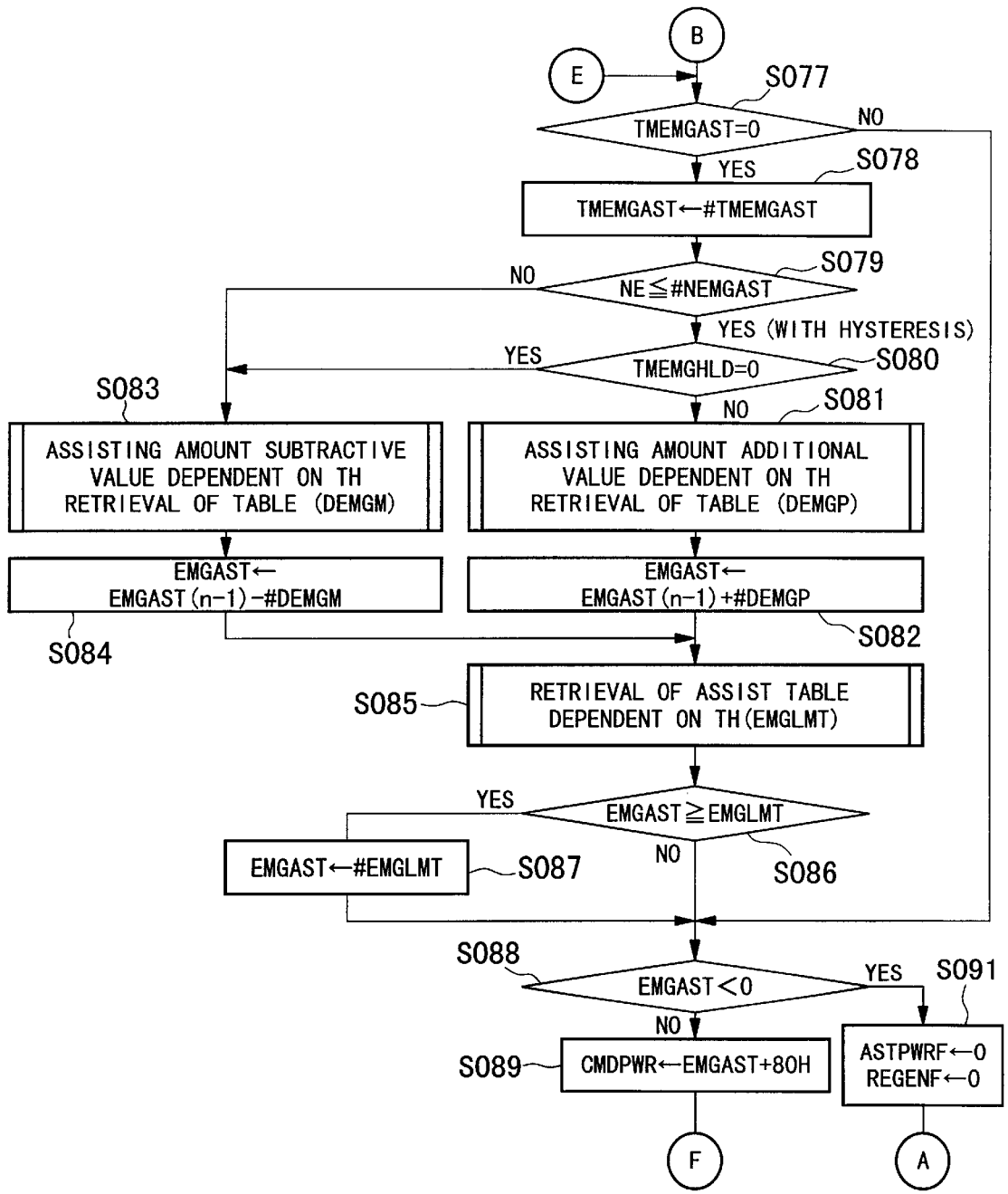
FIG. 5 is a flow-chart showing forced assistance control after returning from the fuel cut mode.

Next, an enforced assistance control after returning from the fuel cut during the low engine speed is explained with reference to FIGS. 3 to 5. This control operation has the objective of suppressing further reduction of the engine speed and for minimizing any shock to the driver at the time of acceleration by addition of the enforced motor assistance at the time of returning from the fuel cut in which the engine is maintained at the low engine speed.

In step S050, a judgement is made as to whether an emergency assistance flag F_EMGAST is "1". When it is determined in step D050 that the emergency assistance flag F_EMGAST is "1", the flow goes to step S056. When it is determined in step D050 that the emergency assistance flag F_EMGAST is "0", the flow goes to step S051. In step S051, a judgement is made as to whether the previous fuel cut flag F_FC is "1". When the result of the judgement in step S051 is "NO", the flow then goes to step S72.

The emergency assist amount EMGAST is set to "0" in step S072, the emergency power generation amount EMGREGN is set to "0" in step S073, the emergency assist flag F_EMGAST is set to "0" in step S074, the emergency assistance flag F_EMGASTI is set to "0" in step S075, and the flow is returned.

When the result of the judgement in step S051 is "YES", the flow goes to step 052, wherein a judgement is made as to whether the present fuel cut judgement flag F_FC is "1". When the result of the judgement in step S052 is "YES", the flow goes to step 072. When the result of the judgement is "NO", the flow goes to step 053.

In step S053, a judgement is made as to whether the idle stop execution judgement flag F_FCEX is "0". If the result is "NO", the flow goes to step S072. When the result is "YES", the flow goes to step S054, wherein the emergency assistance flag F_EMGAST is set to "1" and the flow goes to step S057 after substituting the final calculation value of the power generation amount REGENF for the emergency power generation amount EMGRGN in step S055. The state after the final calculation value of the power generation amount is substituted for the emergency power generation amount EMGRGN is shown as "a" in FIG. 6.

In step S056, a judgement is made as to whether the neutral switch flag F_NSW is "1". When the result of the judgement is "YES", that is, when it is determined that the gear position is neutral, the flow goes to step S072. When the result of the judgement in step S056 is "NO", that is, the vehicle is in the in-gear state, the flow goes to step S057.

In step S057, a judgement is made as to whether the clutch switch flag F_CLSW is "1". When the result of the judgement indicates that the clutch is in the "disconnected" state, the flow goes to step S072. When the result of the judgement in step S057 indicates that the clutch is in the "connected" state, the flow goes to step S058.

In step S058, a judgement is made as to whether the emergency assistance flag F_EMGASTI is "1". When the result of the judgement is "NO", the flow goes to step S59, wherein the emergency hold timer TMEMGHLD is set to a predetermined value #TMEMGHLD, and the flow goes to step S062 after setting the emergency assistance flag F_EMGASTI to "1" in step S060.

In step S062, a judgement is made as to whether the engine speed NE is equal to or lower than a predetermined rotational number #NEMGAST (for example, 700 rpm). When the result is "NO", that is, when it is determined that the engine speed NE is higher than the predetermined rotational number #NEMGAST, the flow goes to step S077. Here, the above described predetermined rotational number #NEMGAST is a value having a hyteresis.

When the result of the judgement in step S062 is "YES", that is, when the engine speed NE is lower than the predetermined value #NEMGAST, the flow goes to step S063, wherein a judgement is made as to whether the final command value CMDPWR to the motor is an assistance command or an power generation command.

When the result of the judgement in step S063 is "YES", that is, when the final command to the motor is to assist, the flow goes to step S064 and a judgement is made as to whether the assistance permission flag F_ACCAST is "1". When the result of the judgement in step S064 indicates that the assistance permission flag F_ACCAST is "1", the flow goes to step S065. In step S065, a judgement is made as to whether the final assistance calculation value ASTPWR is higher than the emergency assist amount EMGAST.

When the result of the judgement in step S065 indicates that the final assistance calculation value ASTPWR is larger than the emergency assist amount EMGAST, the flow goes to step S072. That is, in this case, the emergency assistance is not required because the normal assistance is sufficient for assisting the engine drive. When the result of the judgement in step S065 indicates that the final assistance calculation value ASTPWRF is equal to or lower than the emergency assist amount EMGAST, the flow goes to step S066, wherein a predetermined value #TMEMGHLD is set to the emergency hold timer TMEMGHLD and the flow further goes to step S077. When the result of the above judgement in step S064 indicates that the assist permission flag F_ACCAST is "0", the flow goes to step S066.

When the result of the judgement in step S063 is "NO", that is, when it is determined that the vehicle is in regeneration, a judgement is made in step S67 as to whether the emergency assist timer TMEMGAST is "0". When the result of the judgement in step S067 is "NO", the flow goes to step S070. When the result of the judgement in step S067 is "YES", the flow goes to step S68, wherein the gradual subtraction term #DEMGRGN of the emergency power generation amount is gradually subtracted from the emergency power generation amount EMGRGN so as to reduce the engine load, and when setting the final command value CMDPWR for the motor, the emergency power generation amount is subtracted from 80H (=0). The change due to the subtraction of the regeneration amount is shown between the "a" to "b" states and the flow is returned.

In the above described step S077, a judgement is made as to whether the emergency assist timer TMEMGAST is "0". When the result of the judgement in step S077 is "NO", the flow goes to step S088. When the result of the judgement in step S077 is "YES", then the flow goes to step 078, wherein the emergency assist timer TMEMGAST is set to a predetermined value #TMEMGAST, and the flow further goes to step S079.

In step S079, a judgement is made as to whether the engine speed NE is equal to or lower than the predetermined engine speed #NEMGAST. When the result of the judgement is "NO", that is, when the engine speed NE is higher than the predetermined engine speed #NEMGAST (for example, 700 rpm, described above), the flow goes to step S083. When the result of the judgement in step S079 is "YES", that is, when the engine speed is equal to or lower than the predetermined engine speed #NEMGAST, the flow goes to step S080. In step S080, a judgement is made as to whether the emergency hold timer TMEMHLD is "0". When the result of the judgement is "YES", the flow then goes to step S083. When the result of the judgement in step S080 is "NO", the flow then goes to stop S081.

Figure 6:
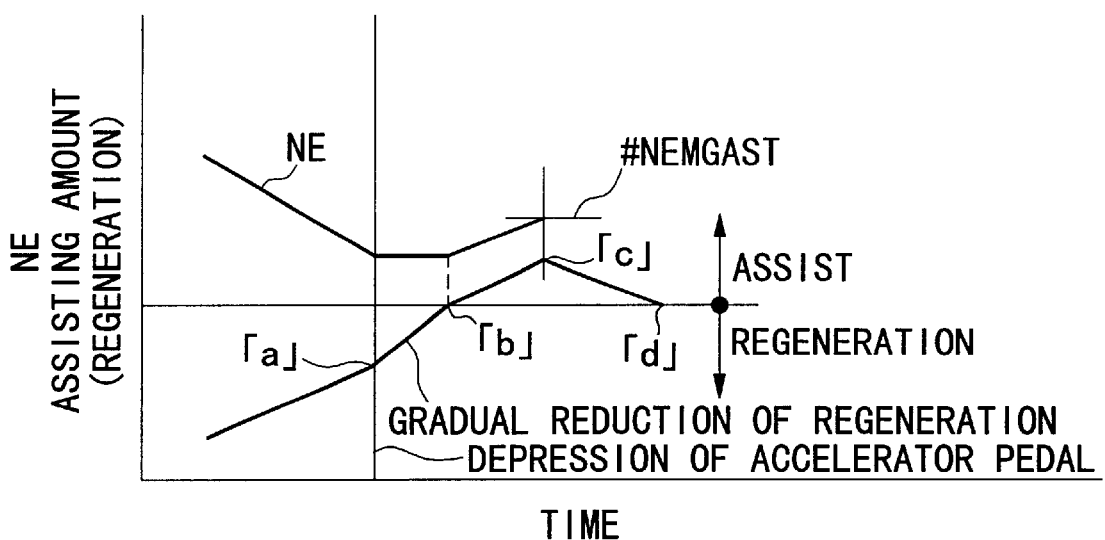
FIG. 6 is a graph showing the engine speed, the amount of power regenerated, and the assist amount.

In step S081, the additional value of the assist amount DEMGP depending upon the degree of the throttle opening TH is retrieved from the table of the assist amount additional value, and, in the next step S082, the additional amount DEMGP is gradually added to the emergency assist amount EMGAST and the flow goes to step S085. That is, the above mentioned processes leading to step S81 suggest that the assistance is still necessary, so that the gradual addition of the assist amount is carried out. The result of this processing is shown from "b" to "c" in FIG. 6. In this range, the engine speed increases as shown in FIG. 6.

In step S083, the subtraction amount DEMGM of the assist amount depending upon the degree of the throttle opening is retrieved from the table showing the assist amount subtractive value, and in the next step S084, the subtraction value DEMGM is gradually subtracted from the emergency assist amount EMGAST and the step goes to step S085. That is, when the processing reaches step S83, it suggests that the assistance is sufficient, so that the gradual subtraction of the assist amount becomes necessary. The result of this processing is depicted from "c" to "d" in FIG. 6.

In step S085, the emergency assist amount limit #EMGLMT depending upon the degree of the throttle opening is retrieved from the ASSIST table. In the next step S086, a judgement is made as to whether the emergency assist amount is equal to or higher than the emergency assist amount limit #EMGLMT. This is for not carrying out the assist operation beyond the higher limit.

When the result of the judgement in step S086 is "YES", that is, when the emergency assist amount EMGAST is higher than the emergency assist amount limit #EMGLMT, the emergency assist amount limit #EMGLMT is set to the emergency assist amount EMGAST and the flow goes to step S088. When the result of the judgement in step S086 is "NO", that is when the emergency assist amount EMGAST is lower than the emergency assist amount limit #EMGLMT, the flow goes to step S088.

In step S088, a judgement is made as to whether the emergency assist amount is lower than "0". When the result of the judgement in step S088 indicates that the emergency assist amount is lower than "0", "0" is set to both the final calculation value ASTPWR of the assist amount and the final calculation value REGENF of the power generation amount, and the flow goes to step S072. When the result of the judgement in step S088 indicates that the emergency assist amount is higher than "0", an additional value of the emergency assist amount EMGAST and 80H (=0) are set in place of the final command value CMDPWR to the motor and the flow returns.

Accordingly, when the engine speed is lower than the predetermined engine speed #NEMGAST at the time of the emergency assistance, the engine load is reduced by gradual subtraction of the regeneration amount. Furthermore, when the engine speed exceeds a predetermined engine speed at the time of the emergency assistance, a comparison is made in step S079 between the engine speed NE and the predetermined engine speed #NEMGAST, when the engine speed NE is higher than the predetermined engine speed #NEMGAST, the assist amount is gradually subtracted in step S083, and when the engine speed NE is lower than the predetermined engine speed #NEMGAST, the assist amount is gradually added in step S081. As a result, the above operation makes it possible to provide a feel of good drivability by minimizing any shock which may arise when switching from regeneration to the assist operation at the time of emergency assist operation.

[Control by calculating the gradual fuel addition coefficient]

Figure 7:
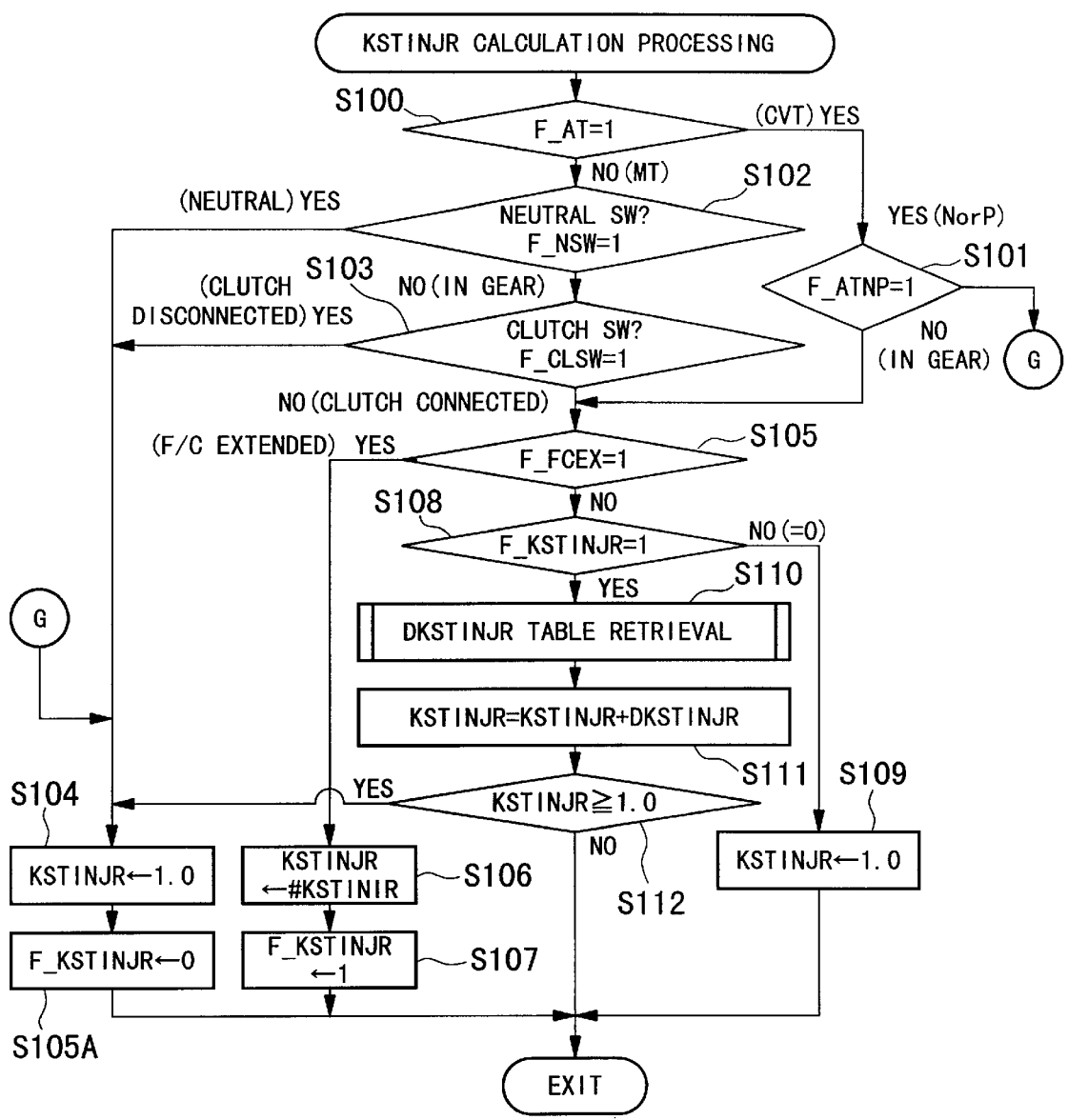
FIG. 7 is a flow-chart showing the calculation process for obtaining the gradual fuel additional coefficient.

Next, the flow-chart for calculating the gradual fuel additional coefficient after returning from the fuel cut will be described with reference to FIG. 7. This control allows execution of an operation of the gradual addition of the fuel after returning from the fuel cut at a low engine speed.

In step S100, a judgement is made as to whether the MT/CVT judgement flag F__AT is "1". When the result of the judgement is "YES", that is, when the car is a CVT car, the flow goes to step S101, wherein a judgement is made as to whether the N, P position judgement flag F__ATNP is "1". When the result of the judgement in step S101 is "YES", that is, the gear position is N or P position, the flow goes to step S104, wherein 1.0 is set as the gradual fuel additional coefficient after the fuel cut, and the flow goes to step S105A for setting "0" as the gradual fuel addition flag F__KSTINJR after the fuel cut and the flow is completed.

When the result of the judgement is "NO", that is, when the position is in gear, the flow goes to step S105.

When the result of the judgement in step S100 is "NO", that is, when the car is a MT car, the state of the neutral switch is judged in step S102 by a judgement as to whether the neutral switch judgement flag F__NSW is "1". When the result of the judgement in step S102 is "YES", that is, when it is determined that it is neutral, the flow goes to step S104. When the result of the judgement in step S102 is "NO", that is, when the state is in gear, the flow then goes to step 103.

In step S103, the state of the clutch switch is judged by the judgement as to whether the clutch switch F__CLSW is "1". When the result of the judgement is "NO", which indicates that the clutch is "connected", the flow goes to step S105. When the result in step S103 is "YES", that is, when it is determined that the clutch is "disconnected", the flow goes to step S104.

In step S105, a judgement is made as to whether the idle stop execution judgement flag F__FCEX is "1". When the result of the judgement is "YES", that is, when it is determined that the idle stop is in progress, the flow goes to step S106, wherein a predetermined value #KSTINIR is set as the gradual fuel additional coefficient after returning from the fuel cut KSTINJR, and in step S107, the gradual fuel additional flag F__KSTINJR is set to "1" after returning from the fuel cut F__KSTINJR and the flow is completed.

When the result of the judgement in step S105 is "NO", that is, when the idle stop is suspended after returning from the idle stop, the flow goes to step S108. In step S108, a judgement is made as to whether the gradual fuel addition flag after returning from the fuel cut F__KSTINJR is "1". When the result of the judgement is "NO", that is, when it is determined that the gradual fuel addition flag after returning from the fuel cut F__KSTINJR is "0", the gradual fuel additional coefficient is set to "0" after returning from the fuel cut KSTINJR in step S109, and the flow is completed.

Figure 8:
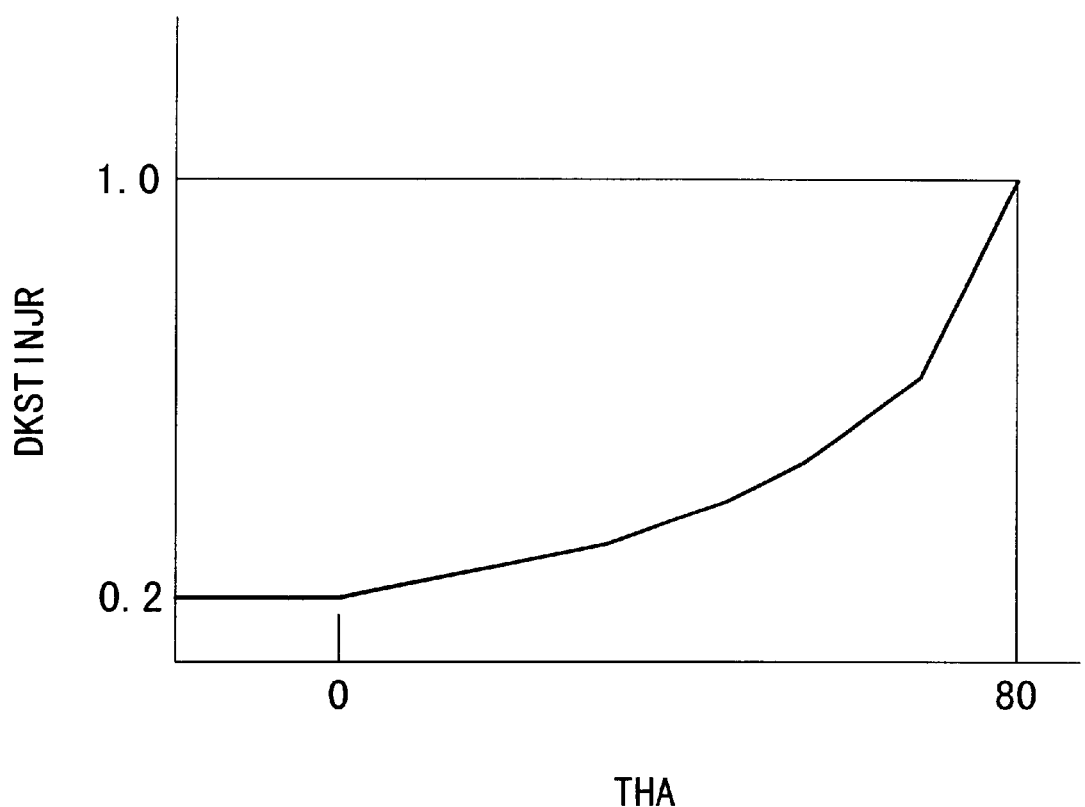
FIG. 8 is a graph showing the relationship between the degree of throttle opening and the increment of the gradual fuel additional coefficient.

When the result of the judgement in step S108 is "YES", that is, when it is determined that the gradual fuel addition flag after returning from the fuel cut F__KSTINJR is "1", the flow goes to step S110, wherein a delta value DKSTINJR of the gradual fuel additional coefficient after returning from the fuel cut is obtained by retrieving it from a table. As shown in FIG. 8, since the delta value DKSTINJR of the gradual fuel additional coefficient after returning from the fuel cut gradually increases with the increase of the degree of the throttle opening THA, the delta value DKSTINJR can be retrieved from the value of the degree of the throttle opening.

In step S111, the delta value of the gradual fuel additional coefficient after returning from the fuel cut DKSTINJR, obtained by retrieval from the table, is gradually added to the gradual fuel additional coefficient after returning from the fuel cut KSTINJR, and, in step S112, a judgement is made as to whether the gradual fuel additional coefficient after returning from the fuel cut KSTINJR is equal to or larger than 1.0.

When the result of the judgement in step S112 is "YES", that is, when the gradual fuel additional coefficient after returning from the fuel cut KSTINJR is equal to or higher than 1.0, the flow goes to step S104. When the result of the judgement in step S112 is "NO", that is, when the gradual fuel additional coefficient after returning from the fuel cut KSTINJR is lower than 1.0, the flow is completed after repeating the gradual addition.

Consequently, when returning from the idle stop mode, gradual addition of the fuel is executed, and in addition to the gradual addition of the motor assist amount, smooth acceleration of the car can be achieved.

According to the above embodiment, when the driver intends to accelerate the car, while the car is in the idle stop mode, and when the engine speed NE is lower than the returnable speed (that is, the result of the judgement in step S025 is "NO"), the engine can be driven by the motor such that stopping of the engine can be prevented. Thereby, it is not necessary to set the returnable speed at higher speed in order to prevent the engine from stopping, and it is possible to set the returnable speed at a lower speed than the emergency motor start permission lower limit engine speed #NEMGMOT which results in improving the fuel consumption rate.

Furthermore, when the engine speed NE is lower than the predetermined engine speed at the time of emergency assist operation #NEMGAST, the engine load is reduced by the gradual reduction of the regenerative amount. When the engine speed exceeds the predetermined engine speed at the time of emergency assist operation #NEMGAST, a comparison is again made in step S079 between the engine speed NE and the predetermined engine speed #NEMGAST, and when the engine speed NE is higher than the predetermined engine speed #NEMGAST, the assist amount is gradually reduced, and when the engine speed NE is lower than the predetermined engine speed "NEMGAST, the assist amount is gradually increased. Consequently, it is possible to prevent any shock that may occur in the case of shifting from the regenerative mode to the assist mode in the emergency assist operation, and to provide the driver a feel of good drivability.

In addition, when returning from the fuel cut in the idle stop mode, the fuel is gradually added in step S111, the car speed can increase gradually and the car can be accelerated smoothly in addition to the gradual addition of the assist amount.

The output control apparatus of the present invention has the effect of making it possible to assist the engine power by the motor when the driver depresses, for example, the accelerator pedal, even when the vehicle is in the fuel cut mode and the engine speed is below a predetermined engine speed. That is, when the driver depresses the accelerator pedal, and when the engine speed at that time is below a predetermined engine speed, while the deceleration fuel cut judgement device judges that the vehicle is in the deceleration fuel cut mode, the assistance of the engine power by the motor becomes possible when the deceleration fuel cut returning time permission judgement device determines to return from the fuel cut mode, and when the output assistance judgement device determines to assist the engine power by the motor. This feature has the effect of reducing the excess load on the engine and preventing the engine from stopping.

In addition, this feature also provides for smooth acceleration of the vehicle and comfortable drivability.

What is claimed is:

1. An output control apparatus of a hybrid vehicle comprising:

an engine, a motor for assisting the output power of said engine, and a battery device for supplying electric power to said motor;

an output assistance judgement device for judging whether said motor should assist an output of the engine depending upon the driving conditions of said vehicle;

a controlling amount setting device for setting the assisting amount of said motor depending upon a driving state of said engine when the output of the engine is judged to be assisted by said output assisting judgement device, an output assistance control device for carrying out the output assistance to said engine by said motor based on the assisting amount set by said controlling amount setting device; and an engine speed detecting device for detecting the engine speed;

a deceleration fuel cut judging device for judging whether the fuel supply should be cut at the time of decelerating the vehicle and started at the time when returning from the fuel supply cut; and a deceleration fuel cut returning time permission judgement device, provided with said output assistance judgement device, for permitting the engine output assistance by said motor, when said deceleration fuel cut judging device judges that the fuel supply is to be started returning from the fuel supply cut, and when it is detected by said engine speed detecting device that the engine speed at the time of starting the fuel supply returning from the fuel supply cut is lower than a predetermined engine speed.

2. An output control apparatus of a hybrid vehicle according to claim 1, further comprising of a gradual fuel addition device for gradually increasing the fuel supply when returning from the time of the fuel supply cut.

* * * * *